(12) United States Patent
Ohmori et al.

(10) Patent No.: US 7,685,733 B2
(45) Date of Patent: Mar. 30, 2010

(54) MICRO FORCE MEASUREMENT DEVICE, MICRO FORCE MEASUREMENT METHOD, AND MICRO SURFACE SHAPE MEASUREMENT PROBE

(75) Inventors: Hitoshi Ohmori, Saitama (JP); Yutaka Watanabe, Saitama (JP); Shinya Morita, Saitama (JP); Yoshihiro Uehara, Saitama (JP); Weimin Lin, Saitama (JP); Kazutoshi Katahira, Saitama (JP)

(73) Assignee: Riken, Saitama (JP)

( * ) Notice: Subject to any disclaimer, the term of this patent is extended or adjusted under 35 U.S.C. 154(b) by 657 days.

(21) Appl. No.: 11/566,377

(22) Filed: Dec. 4, 2006

(65) Prior Publication Data

US 2007/0126314 A1 Jun. 7, 2007

(30) Foreign Application Priority Data

Dec. 2, 2005 (JP) ............................. 2005-349468

(51) Int. Cl.
*G01B 7/00* (2006.01)
(52) U.S. Cl. ....................................................... 33/559
(58) Field of Classification Search .................. 33/559, 33/558, 556, 561, 557, 560
See application file for complete search history.

(56) References Cited

U.S. PATENT DOCUMENTS

| | | | |
|---|---|---|---|
| 2,558,563 A | | 6/1951 | Janssen |
| 3,831,283 A | * | 8/1974 | Pagella et al. .................. 33/559 |
| 3,869,799 A | * | 3/1975 | Neuer et al. .................... 33/561 |
| 4,492,034 A | * | 1/1985 | Nishina et al. ................. 33/558 |
| 5,012,591 A | * | 5/1991 | Asakawa ....................... 33/832 |
| 5,144,150 A | | 9/1992 | Yoshizumi et al. |

(Continued)

FOREIGN PATENT DOCUMENTS

EP 0 405 176 A1 1/1991

(Continued)

OTHER PUBLICATIONS

European Search Report in corresponding application No. EP 06 02 4833 completed Apr. 11, 2007 and mailed Apr. 25, 2007.

(Continued)

*Primary Examiner*—Christopher W Fulton
(74) *Attorney, Agent, or Firm*—Griffin & Szipl, P.C.

(57) ABSTRACT

There is disclosed a micro surface shape measurement probe including a probe shaft 4 having at a distant end thereof a probe member 2 for contacting an object 1 to be measured, a probe body 21 provided with support means for movably supporting the probe shaft 4 in a non-contact manner, a pressing device for pressing and moving the probe shaft 4 toward the object 1 to be measured, a piezoelectric sensor 8a incorporated in the probe body 21 so that a reactive force acts to a pressing force applied to the probe shaft by the pressing device, a load detecting device 8b to measure a load acting on the piezoelectric sensor, a control device 9 for adjusting the pressing force applied by the pressing device based on the load detected by the load detecting device, and a displacement amount measuring device for measuring a position of the probe member 2 in contact with the object 1 to be measured by the pressing force adjusted by the control device 9.

14 Claims, 11 Drawing Sheets

U.S. PATENT DOCUMENTS

| | | | | |
|---|---|---|---|---|
| 5,174,039 | A | * | 12/1992 | Murai .......................... 33/556 |
| 5,247,751 | A | * | 9/1993 | Ohya et al. ................... 33/561 |
| 5,396,712 | A | * | 3/1995 | Herzog ........................ 33/503 |
| 5,822,877 | A | * | 10/1998 | Dai ............................. 33/560 |
| 5,924,827 | A | | 7/1999 | Mora et al. |
| 6,760,977 | B2 | * | 7/2004 | Jordil et al. .................. 33/558 |
| 7,065,893 | B2 | * | 6/2006 | Kassai et al. ................. 33/554 |

FOREIGN PATENT DOCUMENTS

| | | |
|---|---|---|
| EP | 0 471 371 A2 | 2/1992 |
| EP | 0 597 299 A2 | 5/1994 |
| EP | 1 134 543 A1 | 9/2001 |
| JP | 58-18133 | 2/1983 |
| JP | 01-032108 | 2/1989 |
| JP | 2000-304529 | 11/2000 |
| JP | 2000-352536 | 12/2000 |
| WO | 00/52419 | 9/2000 |

OTHER PUBLICATIONS

Extended European Search Report issued in corresponding application No. EP 06 02 4833, completed May 22, 2007 and mailed May 31, 2007.

* cited by examiner

MICRO FORCE MEASUREMENT DEVICE, MICRO FORCE MEASUREMENT METHOD, AND MICRO SURFACE SHAPE MEASUREMENT PROBE

This application claims priority from Japanese Patent Application No. 2005-349468, filed Dec. 2, 2005, the entire disclosure of which is incorporated herein by reference.

BACKGROUND OF THE INVENTION

1. Technical Field of the Invention

The present invention relates to a technology to measure a micro surface shape of an object to be measured. More particularly, the present invention relates to a micro surface shape measurement probe capable of minutely adjusting a contact pressure between a probe member and an object to be measured. Furthermore, the present invention relates to a micro force measurement device capable of measuring a micro force in order to minutely adjust a contact pressure.

2. Description of the Related Art

A technology to measure a shape of an object to be processed on a processing machine, a so-called on-machine measurement technology is indispensable in performing highly precise processing. This on-machine measurement technology can not only eliminate a positioning error during attachment/detachment of the object to be processed but also save labor hours necessary for arrangements during the attachment/detachment work to achieve improvement of a processing efficiency and automation at the same time.

As a device for measuring the shape of the object to be processed, there has heretofore been known a probe type shape measurement sensor in which a distant end of a measurement probe is brought into contact with the surface of the object to be processed to measure the shape of the object (e.g., Patent Document 1).

During such surface shape measurement, in general, the smaller a contact pressure is, the more precise surface shape measurement can be performed.

[Patent Document 1]

International Patent Publication No. WO00/52419 "Probe Type Shape Measurement Sensor, and NC Processing Device and Shape Measurement Method using the Sensor"

However, in the conventional technology, in order to bring the probe distant end into contact with an object to be measured, the probe is pressed, moved and brought into contact with the object to be measured by a pneumatic pressure or the like, but this adjustment of a pressing force has a limitation of about 50 mgf. Such a technology to adjust the pressing force by such a pneumatic pressure is described in Patent Document 1 described above.

Moreover, even when a method of adjusting the pressing force by the pneumatic pressure is devised so as to increase a control resolution of a regulator or perform a multistage control, there is a problem that the device becomes larger in size or a stable operation is not easily performed.

Therefore, it has been difficult to adjust the contact pressure further minutely below 50 mgf. This has been a factor for determining a limitation of the precision of micro surface shape measurement.

Furthermore, the following factors inhibit precise surface shape measurement.

In a case where the probe distant end is brought into contact with the object to be measured, when the surface of the object to be measured is inclined with respect to the probe distant end, there has been a problem that a probe shaft is laterally displaced. In a case where the probe distant end is formed into a spherical shape, when this distant end ball is attached to a shaft portion of the probe, there has been a problem that an attachment error is generated.

SUMMARY OF THE INVENTION

Therefore, an object of the present invention is to provide a micro force measurement device capable of solving the above problems and performing precise surface shape measurement.

Moreover, another object of the present invention is to provide a micro surface shape measurement probe capable of adjusting a contact pressure between the probe and an object to be measured further minutely as compared with a conventional technology. A still another object of the present invention is to provide a micro surface shape measurement probe capable of solving a problem of lateral deviation of the probe in a case where the surface of an object to be measured is inclined with respect to the probe, and a micro surface shape measurement probe which solves a problem of an attachment error of a distant end ball.

To achieve the above objects, according to the present invention, there is provided a micro force measurement device comprising: a probe member for contacting an object; a support structure for supporting the probe member in a non-contact manner; a pressing device fixed to the support structure for pressing the probe member onto the object; a piezoelectric sensor incorporated in the support structure so that a reactive force to the pressing contact acts, when the pressing device presses the probe member to bring the contact into contact with the object; voltage supply means for applying an alternating voltage between opposite polar plates of the piezoelectric sensor; and impedance detection means for detecting an impedance between the polar plates of the piezoelectric sensor by converting the impedance into a voltage. Since the alternating voltage is applied to the piezoelectric sensor to detect a load of the sensor by the impedance, a micro contact pressure can stably be measured with a precision of about 1 mgf.

Moreover, according to the present invention, there is provided a micro force measurement device comprising: a support structure for supporting an object to be pressed in a non-contact manner; a pressing device fixed to the support structure for applying a pressing force to the object to be pressed; a piezoelectric sensor incorporated in the support structure so that a reactive force acts, when the pressing device applies the pressing force to the object to be pressed; voltage supply means for applying an alternating voltage between opposite polar plates of the piezoelectric sensor; and impedance detection means for detecting an impedance between the polar plates of the piezoelectric sensor by converting the impedance into a voltage. Since the alternating voltage is applied to the piezoelectric sensor to detect a load of the sensor by the impedance, a micro pressing force can stably be measured with a precision of about 1 mgf.

Preferably, a value of a frequency of the alternating voltage applied between the opposite polar plates of the piezoelectric sensor is in the vicinity of a resonance frequency of the piezoelectric sensor. In consequence, an amplifier in which an initial stage is constituted of a high input resistance is not required, and it is possible to measure a micro load of the piezoelectric sensor with a general amplifier.

According to the present invention, there is provided a micro surface shape measurement probe comprising: a probe shaft having at a distant end thereof a probe member for contacting an object to be measured; a probe body provided with support means for movably supporting the probe shaft in a non-contact manner; a pressing device for pressing and moving the probe shaft toward the object to be measured; a piezoelectric sensor incorporated in the probe body so that a reactive force to a pressing force applied to the probe shaft by the pressing device acts; a load detecting device for measuring a load acting on the piezoelectric sensor; a control device for adjusting the pressing force applied by the pressing device based on the load detected by the load detecting device; and a displacement amount measuring device for measuring a position of the probe member in contact with the object to be measured under the pressing force adjusted by the control device. Since the pressing force is controlled to adjust the contact pressure based on the load of the piezoelectric sensor, the micro surface shape measurement is realized with a precision of about 1 mgf.

According to a preferable embodiment of the present invention, the micro surface shape measurement probe comprises voltage supply means for applying an alternating voltage between opposite polar plates of the piezoelectric sensor, and impedance detection means for detecting an impedance between the polar plates of the piezoelectric sensor by converting the impedance into a voltage. Since the alternating voltage is applied to the piezoelectric sensor to detect the load of the sensor by the impedance, a micro load can stably be measured.

Preferably, a value of a frequency of the alternating voltage applied between opposite polar plates of the piezoelectric sensor is in the vicinity of a resonance frequency of the piezoelectric sensor.

According to a preferable embodiment of the present invention, the probe member has a spherical or needle-like distant end and a shaft portion, the distant end being formed integrally with the shaft portion. In consequence, a problem of an attachment error of a distant end ball is solved.

Moreover, according to a preferable embodiment of the present invention, the probe member has a spherical shape, a conical shape, a pyramid shape or a combined shape of these shapes, and is coated with a hard coating (e.g., diamond like carbon (DLC), TiN, TiC or the like). In consequence, a wear resistance of the probe member improves, a wear coefficient of the distant end portion of the probe member can be selected and adjusted, and an effect is exhibited in bringing the contact into contact with the object to be measured.

According to the present invention, there is provided a micro surface shape measurement probe comprising: a probe shaft having at a distant end thereof a probe member elastically displaced by a contact pressure between the probe member and an object to be measured; a probe body provided with support means for movably supporting the probe shaft in a non-contact manner; a pressing device for pressing and moving the probe shaft toward the object to be measured; a displacement amount measuring device for measuring a position of the probe shaft and an elastic displacement of the probe member with respect to the probe shaft, when the probe member comes into contact with the object to be measured; a micro force detection device which calculates the contact pressure from the position of the probe shaft, the elastic displacement of the probe member with respect to the probe shaft and a spring constant of the probe member; and a control device for controlling a pressing force of the pressing device based on the contact pressure calculated by the micro force detection device. Since the contact pressure can be adjusted based on the elastic displacement of the probe member highly precise micro surface shape measurement is realized.

According to a preferable embodiment of the present invention, a reflective surface is formed on the back surface of the probe member, a central part of the probe shaft is formed of a hollow portion, extending in an axial direction or formed of a transparent material, extending in an axial direction, and the displacement amount measuring device has a laser displacement meter which radiates laser light from a radiating end surface toward the reflective surface through the hollow portion or the transparent material portion to measure a position of the probe member based on reflected lights from the radiating end surface and the reflective surface.

Moreover, according to the present invention, there is provided a micro surface shape measurement probe comprising: a probe shaft having at a distant end thereof a probe member for contacting an object to be measured; a probe body provided with support means for movably supporting the probe shaft in a non-contact manner; a pressing device for pressing and moving the probe shaft toward the object to be measured; and a displacement amount measuring device for measuring a position of the probe member in contact with the object to be measured, wherein the probe member is constituted of a plurality of cantilevers arranged symmetrically with respect to the center of the probe member; and each cantilever has a free end which is positioned in a central part of the probe shaft in a radial direction thereof and comes into contact with the object to be measured; a fixed end fixed to the probe shaft in the vicinity of an outer part thereof in the radial direction; and an elastic connecting portion which connects the free end to the fixed end and is elastically deformed by a contact pressure between the free end and the object to be measured. According to this constitution, even in a case where the probe member is inclined with respect to the object to be measured, since a contact reactive force of the probe shaft in a laterally displaced direction is offset by the plurality of cantilevers, a problem of lateral displacement can be solved. In consequence, even when the object to be measured largely is inclined with respect to the probe member, stable and highly precise measurement is possible.

According to a preferable embodiment of the present invention, a reflective surface is formed on the back surface of the free end of each cantilever, and the displacement amount measuring device has a laser displacement meter which radiates laser light from a radiating end surface toward the reflective surface of each cantilever to measure a displacement of the free end of each cantilever based on reflected light from the radiating end surface and the reflective surface.

Moreover, according to the present invention, there is provided a micro surface shape measurement probe comprising a probe member constituted of a plurality of cantilevers arranged symmetrically with respect to a center of the probe member for contacting an object, wherein each cantilever has a free end which is positioned in a central part in a radial direction thereof for contacting the object; a fixed end fixed in the vicinity of an outer part in the radial direction; and an elastic connecting portion which connects the free end to the fixed end and is elastically deformed by a contact pressure between the free end and the object.

According to a preferable embodiment of the present invention, the micro surface shape measurement probe further comprises a contact sensing device for sensing contact between the probe member and the object, by irradiating a contact point between the probe member and the object with laser light through the probe member and detecting the laser light reflected by the contact point. In consequence, a pressing force can be adjusted based on the contact between the probe member and the object to be measured, and it is possible to prevent breakages of the probe member and the surface of the object due to the contact between them.

According to a preferable embodiment of the present invention, the micro surface shape measurement probe further comprises: a contact sensing device for sensing a contact pressure between the probe member and the object based on a phase difference between laser light emitted to a contact point between the probe member and the object through the probe member and laser light reflected by the contact point and returned through the probe member. In consequence, a pressing force can be adjusted based on the contact pressure sensed from the phase difference between the emitted laser light and the reflected laser light, and it is possible to prevent breakages of the probe member and the surface of the object due to the contact between them.

Furthermore, according to the present invention, there is provided a micro surface shape measurement probe having: a probe member for contacting an object to be measured; a pressing device for pressing and moving the probe member toward the object to be measured; a displacement amount measuring device for measuring a position of the probe member in contact with the object to be measured; a swing table for fixing the object to be measured; swinging means for swinging the swing table in two directions to adjust an angle formed by the probe member and the surface of the object to be measured; and a calculating device for calculating a position of a contact point from a value measured by the displacement amount measuring device and a swing angle formed by the swing means. In consequence, when the object to be measured is swung, the probe member can vertically be brought into contact with the object to be measured. Therefore, it is possible to solve a problem of lateral deviation of the probe member.

In addition, according to the present invention, there is provided a micro force measurement device to measure a static micro load acting on a piezoelectric sensor, the micro force measurement device having: a piezoelectric sensor on which a load acts; voltage supply means for applying an alternating voltage between opposite polar plates of the piezoelectric sensor, with a value of a frequency in the vicinity of a resonance frequency of the piezoelectric sensor; and impedance detection means for detecting an impedance between the polar plates of the piezoelectric sensor by converting the impedance into a voltage. In consequence, a micro load which stably acts on the piezoelectric sensor can be measured with a precision of about 1 mgf, an amplifier in which an initial stage is constituted of a high input resistance is not required, and it is possible to measure the micro load of the piezoelectric sensor with a general amplifier.

Furthermore, according to the present invention, there is provided a micro force detection method comprising: applying a pressing force toward an object while supporting a probe member in a non-contact manner; applying an alternating voltage between opposite polar plates of a piezoelectric sensor arranged so that a reactive force of the pressing force acts; bringing the probe member into contact with the object by the pressing force; and detecting a contact pressure between the probe member and the object by converting an impedance between the polar plates of the piezoelectric sensor into a voltage.

Other objects and advantageous characteristics of the present invention will be apparent from the following description with reference to the accompanying drawings.

DESCRIPTION OF THE PREFERRED EMBODIMENTS

Figure 1:
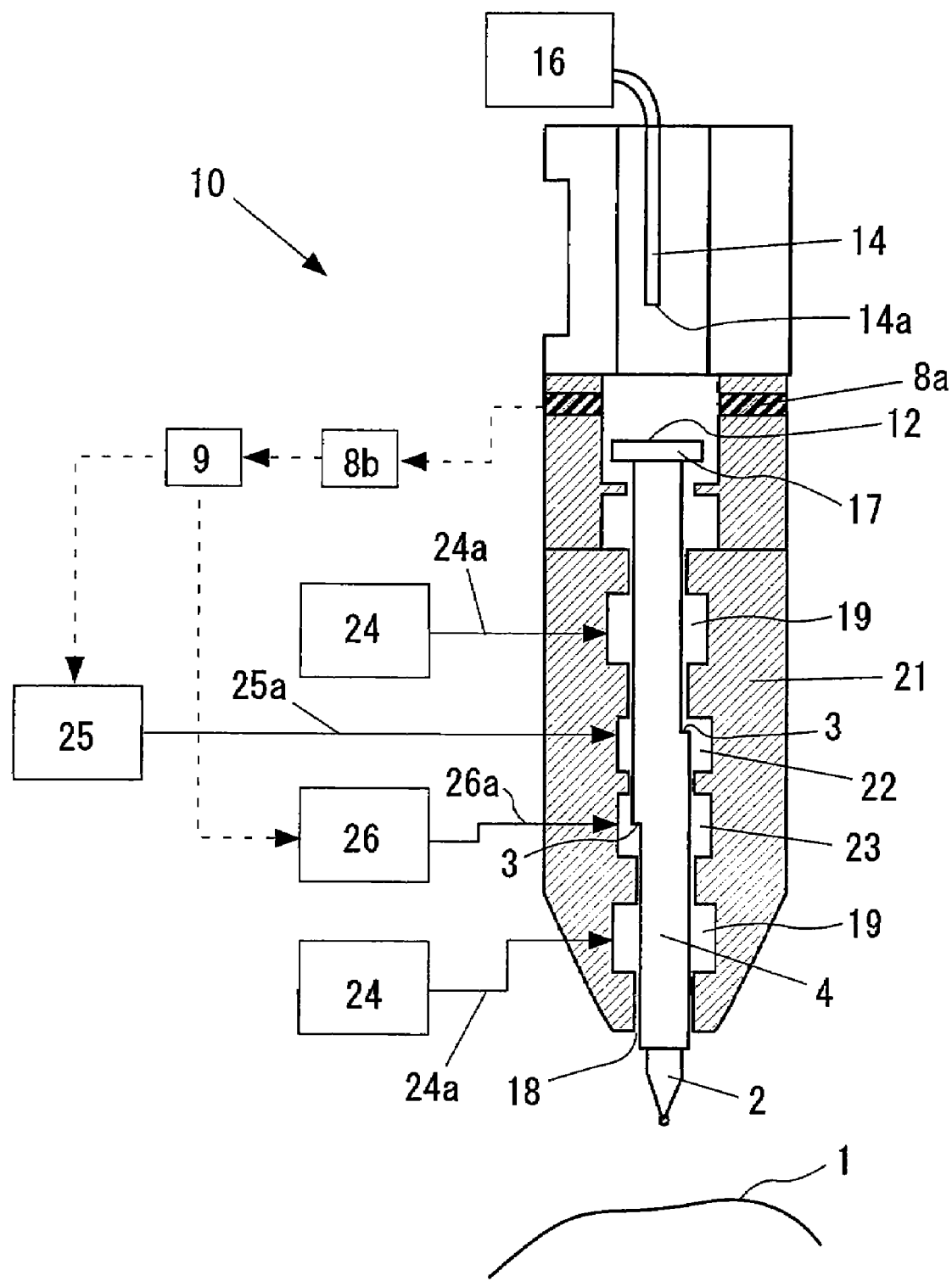
FIG. 1 is a side cross sectional view of a micro surface shape measurement probe according to an embodiment of the present invention.

Preferred embodiments of the present invention will be described with reference to the drawings. It is to be noted that in the drawings, common parts are denoted with the same reference numerals, and redundant description is omitted.

There will be described a micro surface shape measurement probe according to an embodiment of the present invention in the following order:

1. Outline of Micro Surface Shape Measurement Probe;
2. Description of devices of Micro Surface Shape Measurement Probe;
3. Application of Piezoelectric Ceramic;

4. Use Method of Piezoelectric Ceramic;
5. Constitution of Probe member;
6. Object-Measuring Swinging Device; and
7. Pressing Device using Magnetic Force.

1. Outline of Micro Surface Shape Measurement Probe

FIG. 1 is the whole constitution diagram of a micro surface shape measurement probe 10 according to an embodiment of the present invention. As shown in FIG. 1, the micro surface shape measurement probe 10 includes a probe shaft 4 having a probe member 2 on a distant end thereof; a probe body which is a support structure for movably supporting the probe shaft 4; a pressing device (e.g., gas supply means 25, 26) which applies a pressing force to the probe shaft 4 to urge and move the probe shaft 4 toward an object 1 to be measured; a micro force measurement device (e.g., a piezoelectric ceramic 8*a*) which detects a micro contact pressure between the probe member 2 and the object 1 to be measured; a control device 9 which controls the pressing force of the pressing device based on the contact pressure detected by the micro force measurement device; and a displacement amount measuring device (e.g., a laser displacement meter 16 using laser interference) which measures a position of the probe member 2 in contact with the object 1 to be measured. It is to be noted that FIG. 1 shows a case where the probe shaft 4 is disposed in a vertical direction, but the present invention is not limited to this, and the probe shaft 4 may be disposed in a horizontal direction or an oblique direction.

The operation of the micro surface shape measurement probe 10 will briefly be described.

The pressing device presses the probe shaft 4 toward the object 1 to be measured, for example, in a vertical direction, to thereby bring the probe member 2 of the distant end of the probe shaft 4 into contact with the object 1 to be measured. Especially, according to the embodiment of the present invention, as described later, the micro force measurement device can adjust the pressing force and the contact pressure with a precision of about 1 mgf.

Subsequently, the amount of the displacement of the probe member 2 is measured by the displacement amount measuring device, in a state in which the contact between the probe member 2 and the object 1 to be measured is maintained. The displacement amount measuring device is constituted of a reflecting mirror 12, light guide means (e.g., an optical fiber) 14, the laser displacement meter 16, and the like.

A position of a point to be measured is measured, in accordance with a calculation processing of data of this amount of the displacement and a coordinate value of a Z-scale corresponding to a vertical direction of a slider device 20 described later. That is, since there is a limitation in the measurement range of the amount of the displacement of the probe member 2 because of the restriction on the stroke of the probe shaft 4, an absolute position of the point to be measured is measured by the calculation processing of the amount of the displacement of the probe member 2 and the amount of the displacement of the cooperating operation of the slider device 20 in the vertical direction (Z-axis direction).

The reflecting mirror 12 is a plane mirror disposed in an enlarged diameter portion 17 on the rear end of the probe shaft 4, perpendicular to the axis thereof. The light guide means 14 has a radiating end surface 14*a* which faces the reflecting mirror 12 at a predetermined space therebetween. The light guide means 14 has plasticity and a sufficient length, and the other end surface of the light guide means 14 is connected to the laser displacement meter 16 via an optical connector or the like.

The laser displacement meter 16 includes, for example, a semiconductor laser, a light receiving element, an optical fiber coupler and the like, and radiates laser light toward the reflecting mirror 12 through the light guide means 14, so that it measures a position of the reflecting mirror 12 from reflected lights from the reflecting mirror 12 and the radiating end surface 14*a*.

According to this constitution, the position of the reflecting mirror 12, that is, the position of the probe shaft 4, can be measured with a high precision by use of the laser displacement meter 16.

Figure 2:
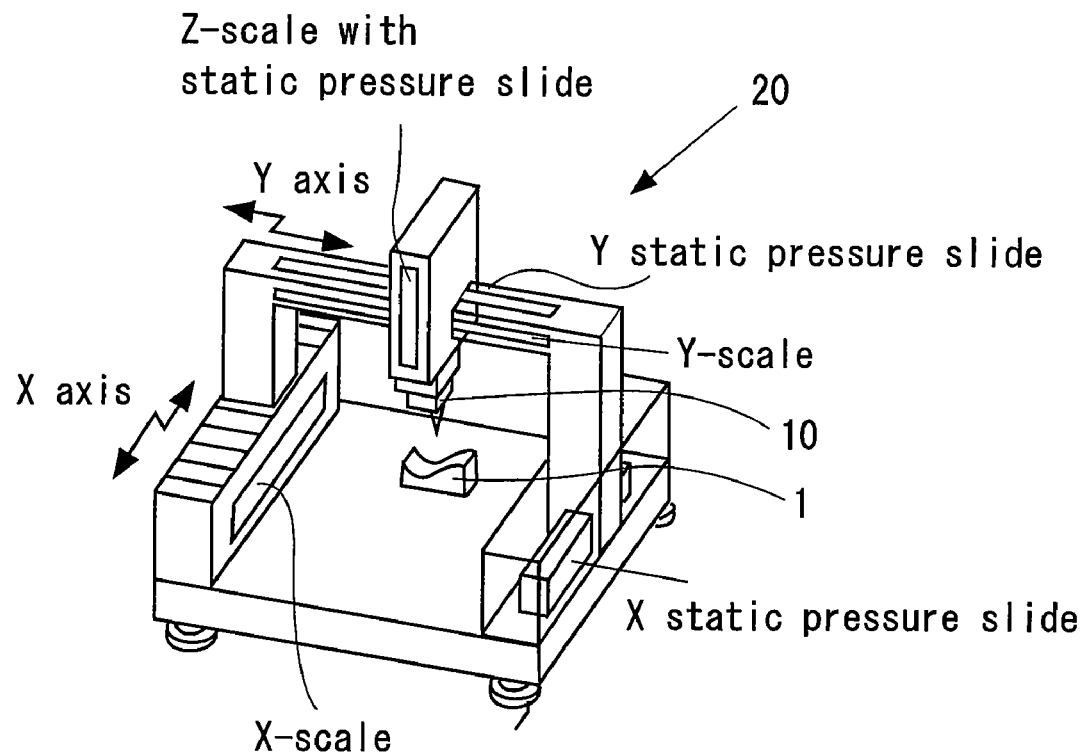
FIG. 2 is a perspective view showing a constitution of a slider device which moves the micro surface shape measurement probe of FIG. 1 horizontally in two directions.

As shown in FIG. 2, the micro surface shape measurement probe 10 is attached to the slider device 20 so as to be movable in the X-direction, the Y-direction and the Z-direction. The slider device 20 moves the micro surface shape measurement probe 10 in a static pressure slide system in which a fluid (a gas such as air or a liquid such as oil) is used as a medium as shown in FIG. 2. An X-coordinate value, a Y-coordinate value and a Z-coordinate value of the micro surface shape measurement probe 10 can be obtained by the X-scale, the Y-scale and the Z-scale of the slider device 20. In consequence, the probe member 2 is scanned along the whole surface of the object to be measured to obtain surface shape data.

In the example of the arrangement of the slider device 20 shown in FIG. 2, the probe member 2 is vertically disposed, but needless to say, the probe member 2 may horizontally be disposed.

Moreover, a grinding tool, a cutting tool, a polishing tool and a discharge/electrochemical machining tool can be attached to the same slider device 20, and the same slider device 20 can perform grinding, cutting, polishing and discharge/electrochemical machining.

2. Description of Devices of Micro Surface Shape Measurement Probe

There will be described the constitution and the operation of devices of the micro surface shape measurement probe in more detail.

The probe shaft 4 has the probe member 2 disposed at the distant end thereof for contacting the object 1 to be measured, and the enlarged diameter portion 17 disposed on the rear end thereof and enlarged in the radial direction, and is disposed in a hollow portion 18 of the probe body. The hollow portion 18 is formed in the vicinity of the center of the probe body in the axial direction of the body. As shown in FIG. 1, when the probe shaft 4 is disposed in the hollow portion 18 of the probe body, support spaces 19 and pressing spaces 22, 23 having annular cross sections are formed between the probe shaft 4 and the probe body. It is preferable that the probe shaft 4 and the hollow portion 18 are formed into such shapes that the probe shaft 4 does not freely rotate, but if they are formed into a rotation symmetric shape, fixed at a predetermined angle and used, the constitution is further effective.

Pressurized gas (compressed air or the like) is supplied from the periphery of the probe shaft 4 to the support spaces 19 at a certain flow rate by gas supply means 24 (constituted of, e.g., an air source, a regulator, an electro pneumatic regulator, and channels 24*a* disposed in the probe body). In consequence, the probe shaft 4 is supported in the hollow portion 18 in a non-contact manner with respect to the probe body.

On the other hand, the pressurized gas is also supplied to the pressing spaces 22, 23 by the gas supply means 25, 26. Each of the gas supply means 25, 26 is constituted of, for example, an air source, a regulator, an electro pneumatic regulator, and a channel 25*a* or 26*a* disposed in the probe body. As shown in FIG. 1, stepped portions 3 are formed on the probe shaft 4 so that they are positioned in the pressing spaces 22, 23. When the pressurized gas is supplied to one pressing space 22, the pressure is applied to the stepped portion 3 by this pressurized gas, and the probe shaft 4 is pressed downwards. When the pressurized gas is supplied to the other pressing space 23, the pressure is applied to the stepped portion 3 by this pressurized gas, and the probe shaft 4 is pressed upwards. When flow rates of the pressurized gases to be supplied to the pressing spaces 22, 23 are adjusted in this manner, the upward or downward pressing force is adjusted to move the probe shaft 4 in the vertical direction. It is to be noted that an excess pressurized gas is supplied to the pressing space 23 at a flow rate corresponding to a weight of the probe shaft 4 to offset the influence of the weight of the probe shaft 4. It is to be noted that the gas supply means 24, 26 and the channels 24a, 26a constitute support means of the probe shaft and the probe member. However, the support means may be constituted of other appropriate members.

In consequence, the pressing force to be applied to the probe shaft 4 can be set to about 50 mgf. However, to obtain a further micro pressing force, that is, contact pressure, it is necessary to adjust the pressing force or the contact pressure further minutely below 50 mgf. Therefore, according to the embodiment of the present invention, when the micro force measurement device is constituted using the piezoelectric ceramic 8a, it is possible to detect the pressing force and the contact pressure with a precision of about 1 mgf. In consequence, while the probe member 2 is brought into contact with the object 1 to be measured with a further micro pressing force as compared with a conventional technology, a cooperating control is performed along a Z-axis, and the contact is further scanned along the surface of the object 1 to be measured in an X-Y plane. In consequence, highly precise surface shape measurement is realized.

3. Application of Piezoelectric Ceramic

According to the embodiment of the present invention, as shown in FIG. 1, the micro force measurement device has a piezoelectric ceramic 8a inserted in and pinched by the rear portion of the probe body, perpendicular to the axial direction, and a load detecting device 8b to detect a load which acts on this piezoelectric ceramic 8a. It is to be noted that in the example of FIG. 1, the piezoelectric ceramic 8a is incorporated in the probe body and a through hole for passing the laser light is formed in the center of the piezoelectric ceramic 8a, in cross section, but the present invention is not limited to this constitution; the piezoelectric ceramic 8a does not necessarily have any through hole, as long as the function of the piezoelectric sensor described later can be realized. In the present embodiment, the piezoelectric ceramic 8a is used as the piezoelectric sensor, but another appropriate piezoelectric sensor may be used.

In a state in which the probe shaft 4 stands still in the non-contact manner with respect to the probe body by the gas supply means 25, 26, a weight of a portion of the probe body positioned below the piezoelectric ceramic 8a, and a force (total force of forces shown by arrows in FIG. 3) of the pressurized gas acting on the probe body by the fact that the gas supply means 25, 26 allow the probe shaft 4 to float and stand still, are acting on the piezoelectric ceramic 8a.

Figure 3:
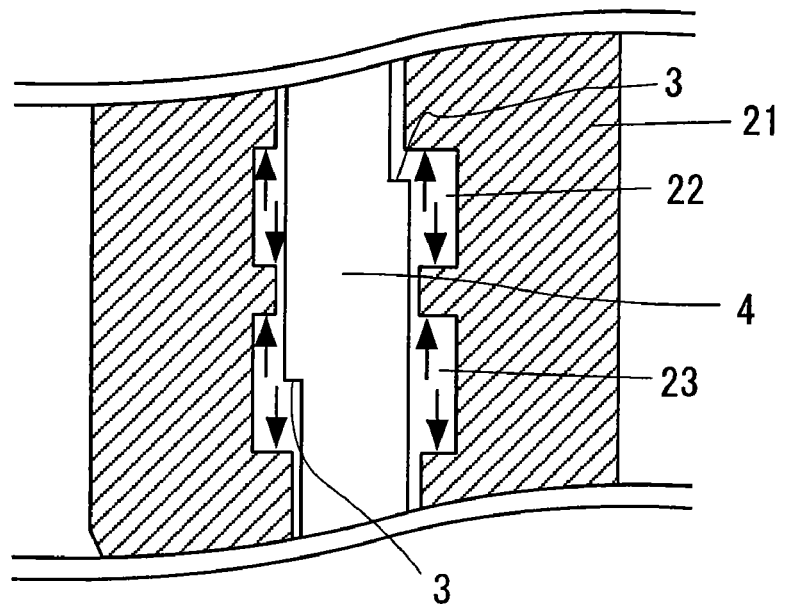
FIG. 3 is an enlarged view showing a pressure which acts on a probe body in a pressing space of the micro surface shape measurement probe of FIG. 1.

From this state, when the flow rates of the pressurized gases supplied to the pressing spaces 22, 23 are adjusted so as to move the probe shaft 4 downwards, the total force of the forces shown by the arrows in FIG. 3 (i.e., a reactive force from the probe shaft 4 to the probe body) increases upwardly, and the load which acts on the piezoelectric ceramic 8a also increases in such a direction as to compress the piezoelectric ceramic 8a.

When the probe shaft 4 is moved to bring the probe member 2 into contact with the object 1 to be measured, the probe shaft 4 is subjected to the reactive force due to the contact between the contact and the object 1 to be measured, but the total force of the forces shown by the arrows in FIG. 3 (i.e., the reactive force from the probe shaft 4 to the probe body) does not change as long as the pressing force is not changed. However, this is a case where air resistance and the like are ignored.

It is possible to minutely adjust the contact pressure between the probe member 2 and the object 1 to be measured, by using this relation between the load of the piezoelectric ceramic 8a and the pressing force. That is, a difference between the load which acts on the piezoelectric ceramic 8a at a time when the probe shaft 4 is allowed to float and stand still by the gas supply means 25, 26 and the load which acts on the piezoelectric ceramic 8a at a time when the probe shaft 4 is pressed downwards by the gas supply means 25, 26 corresponds to a downward pressing force, that is, the contact pressure between the probe member 2 and the object 1 to be measured.

Therefore, the control device 9 can control the pressing force of the pressing device, while the control device 9 performs the cooperating control in the Z-axis, based on a detected load value from the load detecting device 8b.

The load measurement by the piezoelectric ceramic 8a can be performed with a precision of about 1 mgf which is much smaller than a conventional technology precision of about 50 mgf. Therefore, when the piezoelectric ceramic 8a is incorporated in the probe body, the contact pressure can be adjusted with a precision of about 1 mgf.

4. Use Method of Piezoelectric Ceramic

Next, there will be described use of the piezoelectric ceramic in the embodiment of the present invention.

First, characteristics of the piezoelectric ceramic will briefly be described.

Figure 4:
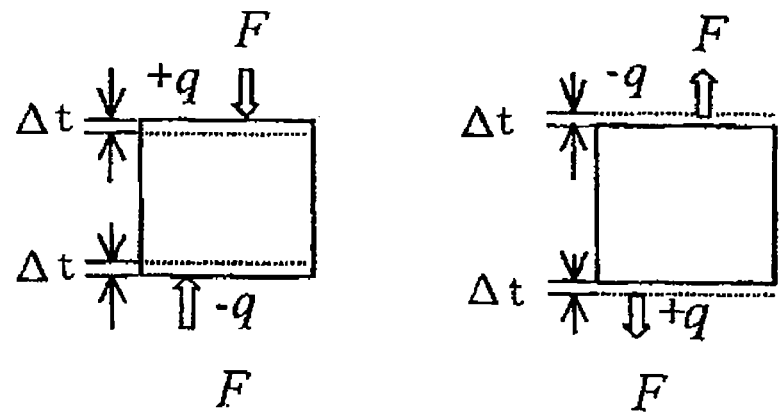
FIG. 4 is a diagram showing a principle of measurement of a load which acts on a piezoelectric ceramic.

FIG. 4 is a diagram showing a principle of load measurement performed by the piezoelectric ceramic. As shown in FIG. 4, when a load F acts on the piezoelectric ceramic, electric charges +q, −q having different polarities are generated in the surfaces of electrodes, respectively. An amount of the generated electric charges is proportional to the amplitude of the load F which acts, and the polarity is determined by the direction of the load. Assuming that a piezoelectric constant is d, a relation between the load F and the electric charge q is represented by [Equation 1].

$$q = dF, \quad \text{[Equation 1]}$$

wherein d is a piezoelectric constant.

The thickness t of the element changes by $\Delta t$ in accordance with the load F. The relation between the displacement $\Delta t$ and the electric charge is represented by [Equation 2].

$$q = d \frac{AY}{t} \Delta t \quad \text{[Equation 2]}$$

wherein A is an area of the element, t is the thickness of the element, Y is the Young's modulus, and $Y = Ft/A\Delta t$.

A voltage V generated between the electrodes is $V = q/C$, C is a capacity between the electrodes, and $C = \epsilon A/t$. Assuming that an output voltage is Vo, [Equation 3] is obtained.

$$V_o = \frac{dt}{\epsilon A} F = g \frac{t}{A} F = gtp \quad \text{[Equation 3]}$$

wherein g is an element constant, and p is a force applied to the element.

The piezoelectric ceramic itself exhibits an idealistic characteristic in measurement of the load or the force. However, an insulation resistance of the piezoelectric ceramic itself is very large. Therefore, to precisely measure the voltage generated between the electrodes of the piezoelectric ceramic, it is necessary to use an amplifier having a large input resistance approximately equal to the insulation resistance. As this type of amplifier, a charge amplifier for a micro current has heretofore been used. This amplifier is determined in accordance with a type of a semiconductor for use in an input stage. The input stage of a general operational amplifier is a bipolar transistor circuit, and it cannot be used since the input resistance is small. Among usable charge amplification circuits, the most frequently used circuit is J-FET or MOS-FET.

Figure 5:
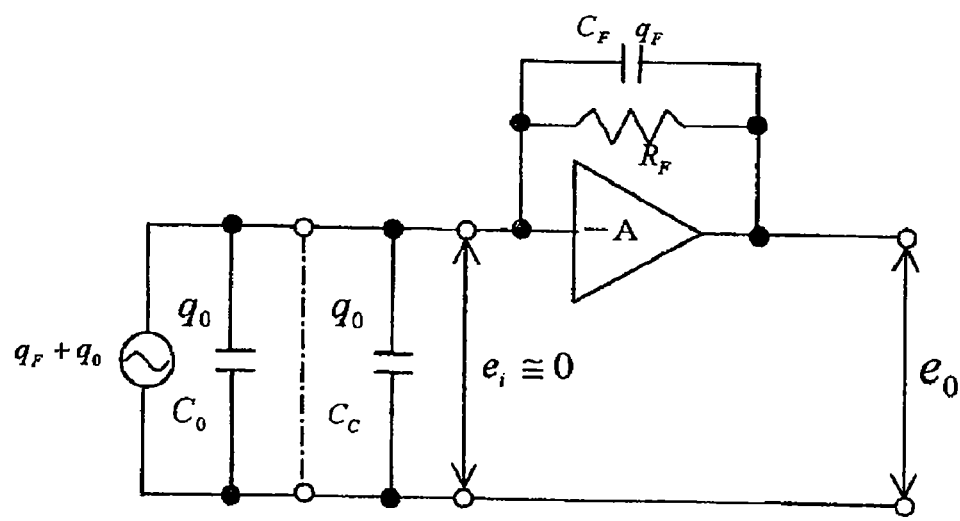
FIG. 5 is a diagram showing a charge amplification circuit of an FET input.

FIG. 5 shows a charge amplification circuit of an FET input, and the circuit of FIG. 5 is an operational amplifier in principle.

It is assumed that an input voltage is $e_i$ and an output voltage is $e_o$. It is also assumed that an electric charge to be stored in a feedback capacity $C_F$ is $q_F$ and electric charges to be stored in an inner capacity $C_0$ of the piezoelectric ceramic and a distribution capacity $C_c$ of a cable is $q_0$. When it is assumed that a feedback resistance $R_F$ is very large, all the charges generated from the piezoelectric ceramic are stored in the input capacity ($C_0 + C_c$) and the feedback capacity $C_F$.

From the relation of [Equation 4], [Equation 5] is obtained.

$$e_0 = -Ae_i, \; e_i - e_0 = \frac{q_F}{C_F}, \; e_i = \frac{q_0}{C_0 + C_c} \quad \text{[Equation 4]}$$

$$q_0 = -q_F \frac{C_0 + C_C}{C_F} \cdot \frac{1}{1+A} \quad \text{[Equation 5]}$$

$$e_i = -\frac{q_F}{C_F} \cdot \frac{1}{1+A}$$

$$e_0 = -\frac{q_F}{C_F} \cdot \frac{A}{1+A}$$

Assuming that an increase ratio A is A>>1, [Equation 6] is obtained.

$$q_0 \cong 0, \; e_i \cong 0, \; e_0 \cong q_F/C_F \quad \text{[Equation 6]}$$

That is, it can be considered that the input voltage $e_i$ is constantly zero, and the charge ($q_0 + q_F$) from the piezoelectric ceramic is equal to the charge $q_F$ stored in the feedback capacity.

Therefore, the output voltage $e_o$ is proportional to the generated charge q. When a micro current flows through the feedback capacity $C_F$ to generate a direct voltage between $C_F$ terminals, an operation point of the amplifier gradually moves, and finally an output of the amplifier is sometimes saturated. Therefore, the feedback resistance $R_F$ of FIG. 5 works so as to eliminate this saturation. On the other hand, in the amplifier, a cut-off frequency $f_c$ is dominated by time constants of $R_F$ and $C_F$. The cut-off frequency is represented by [Equation 7].

$$f_c = \frac{1}{2\pi C_F R_F} \quad \text{[Equation 7]}$$

However, even when the piezoelectric ceramic is used, a large amount of the charge is generated, but it is difficult to measure a static force and a usually moderately fluctuating force or pressure. This problem occurs owing to influences of a small capacity of a connection cable of the piezoelectric ceramic and a low insulation resistance of an amplifier input circuit. In addition, the problem is dominated by a surrounding environment such as temperature or humidity as a cause for leakage.

For example, assuming that the insulation resistance is $R_{in}$, an amplifier output is represented by [Equation 8].

$$e_0 = -\frac{q}{C_F}(1 - e^{-1/\tau t}) \quad \text{[Equation 8]}$$

$$\tau = R_{in}[C_F + C_i(1+A)]$$

$$C_i = C_0 + C_C$$

As seen from [Equation 8], when a stepped force is applied to the piezoelectric ceramic, the output voltage $e_o$ is output in accordance with the amplitude of the force, and then the output voltage $e_o$ exponentially drops in accordance with a time constant $\tau$. It is to be noted that in a case where a small force is measured, since a sensitivity of the amplifier needs to be increased, a small value of the feedback capacity $C_F$ of the amplifier is selected. As a result, the output voltage $e_o$ drops fast, and it is difficult to calibrate a static force. That is, the piezoelectric ceramic has a characteristic that the measurement of the load by use of a piezoelectric effect can be realized with a high sensitivity and a high response. However, when a certain load is applied to the element and the element is allowed to stand for a long time, the output voltage $e_o$ drops and the sensitivity is not obtained finally. In other words, an only pulsating load can be measured.

To solve the problem, in the embodiment of the present invention, the piezoelectric ceramic is used by the following method.

Figure 6:
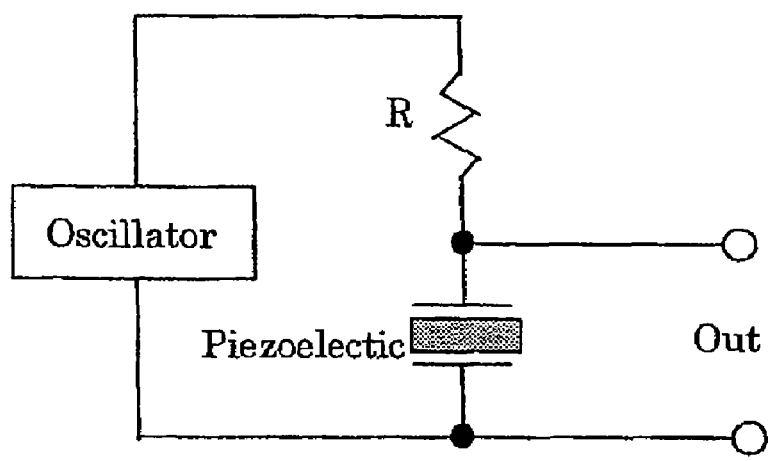
FIG. 6 is a circuit diagram for measuring a resonance characteristic of a piezoelectric ceramic.

FIG. 6 is a circuit diagram for obtaining a resonance characteristic of the piezoelectric ceramic. In FIG. 6, in a state in which there is not any restriction on the piezoelectric ceramic and the ceramic can be freely deformed, a certain voltage is applied between opposite polar plates of the piezoelectric ceramic from an oscillator. A resistance R sufficiently larger than an impedance of the piezoelectric ceramic is connected in series, and a voltage between opposite ends of the piezoelectric ceramic is measured.

Figure 7:
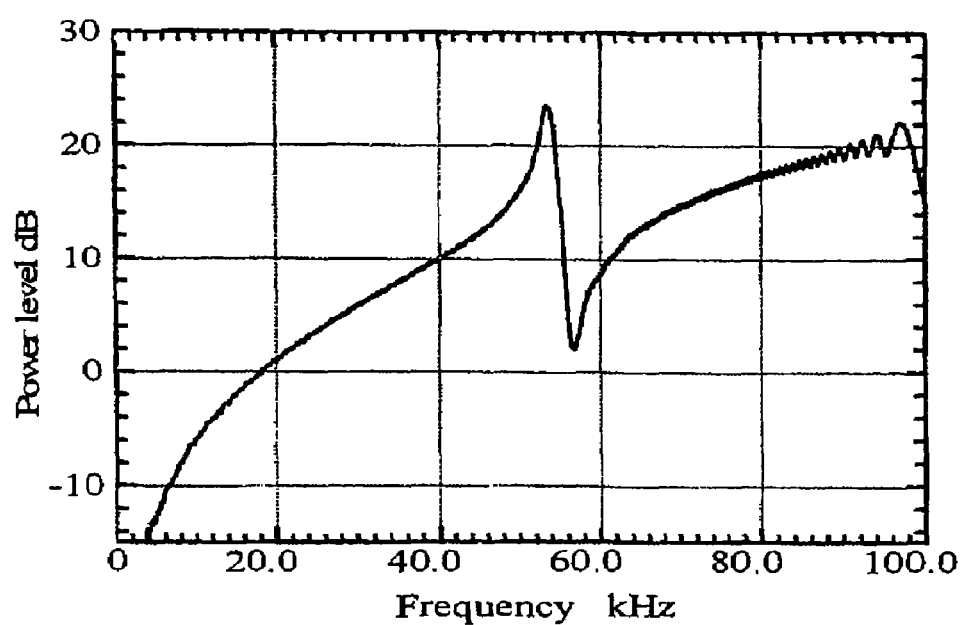
FIG. 7 is a graph showing, in a power level value, an impedance change of the piezoelectric ceramic in a case where a sinusoidal frequency of an oscillator is swept from 10 Hz to 100 kHz in the circuit of FIG. 6.

FIG. 7 is a graph showing that a sinusoidal frequency of the oscillator is swept from 10 Hz to 100 kHz (the abscissa), and showing, in a power level value (the ordinate), an impedance change of the piezoelectric ceramic. A resonance frequency is in the vicinity of about 52.6 kHz, and an antiresonant frequency appears in the vicinity of about 55.0 kHz.

The piezoelectric ceramic has this characteristic. Therefore, when the piezoelectric ceramic comes close to a mechanical resonance point, an elastic strain increases. This is piezoelectrically reflected, and a piezoelectric article is increasingly polarized. As a result, an electric capacity increases. In the resonance point, the increase of the electric capacity reaches its top, and the impedance of the piezoelectric ceramic indicates a minimum value. Thus, as the amplifier in which the piezoelectric ceramic has a sufficiently low impedance in the vicinity of the resonance frequency and the voltage between the opposite ends of the piezoelectric ceramic is amplified, a charge amplifier in which an initial stage is constituted of a high input resistance is not required, and a general amplifier is sufficiently used.

Furthermore, the following experiment was performed.

One of electrode surfaces of a piezoelectric ceramic was fixed to a metal plate with an adhesive, the other electrode surface of the piezoelectric ceramic was constituted as a free end surface, and a load of 0.98 N was put on this free end surface. While a frequency was swept, a constant current was applied between the opposite electrodes. At this time, the voltage between the opposite electrodes of the piezoelectric ceramic was measured. As a result, a change shown in FIG. 8 was obtained. Next, a load of 9.8 N was put on the free end surface of the piezoelectric ceramic, and a similar experiment was performed. This result is also shown in FIG. 8.

Figure 8:
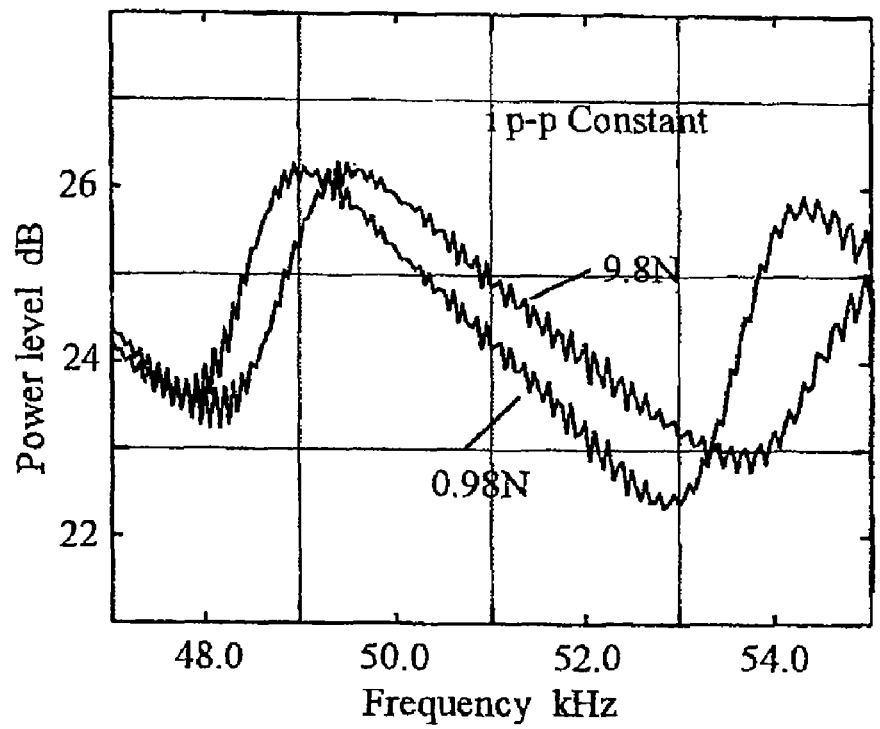
FIG. 8 is a graph showing an impedance (power level value) change of a piezoelectric ceramic with respect to a frequency in a case where different loads act on the piezoelectric ceramic to which a constant voltage has been applied.

As shown in FIG. 8, when the load is applied, the resonance point shifts to a higher frequency, and a frequency change appears. In a case where there is supplied, between the opposite electrodes of the piezoelectric ceramic, a certain voltage or a certain current having a frequency fixed in the vicinity of 51.5 kHz in which the impedance rapidly changes, a resonance characteristic changes in accordance with the amplitude of the load. In consequence, the impedance between the opposite electrodes of the piezoelectric ceramic also changes. At this time, the impedance is converted into a voltage as a sensor output by use of a load sensor. Therefore, a sensor signal can be processed with an alternating-current amplifier, and a temperature characteristic of the sensitivity depends on an only temperature characteristic of the piezoelectric ceramic.

Therefore, as shown in FIG. 1, when the certain voltage having the fixed frequency is applied between the opposite polar plates of the piezoelectric ceramic 8a inserted in and pinched by the probe body 21 as a support structure and the impedance between the polar plates of the piezoelectric ceramic 8a is measured, stable load measurement can be performed. Preferably, while there is applied, between the opposite polar plates of the piezoelectric sensor, the certain voltage having the frequency fixed in the vicinity of the resonance frequency of the piezoelectric ceramic 8a, and the impedance between the polar plates of the piezoelectric ceramic 8a is measured, stable load measurement can be performed. Preferably, while the certain voltage having the frequency fixed in the vicinity of the resonance frequency of the piezoelectric ceramic 8a is applied between the opposite polar plates of the piezoelectric sensor, the impedance between the polar plates of the piezoelectric ceramic 8a is measured. In consequence, the amplifier in which the initial stage is the high input resistance does not have to be used, and the load measurement of the piezoelectric ceramic 8a can be performed with a general amplifier.

Therefore, the impedance change of the piezoelectric ceramic 8a can be processed with the alternating-current amplifier, and the contact pressure between the probe member 2 and the object 1 to be measured can be measured with an excellent sensitivity of about 1 mgf as described above. It is to be noted that voltage supply means for applying an alternating voltage between the piezoelectric ceramics and impedance detection means for converting the impedance of the piezoelectric ceramic into a voltage to detect the impedance constitute a load measuring device. As the voltage supply means and the impedance detection means, known appropriate means can be used.

5. Constitution of Probe Member

The probe member 2 can be constituted of a micro probe having a conical or pyramid shape, and it is preferable that the distant end of the probe member is formed into a pointed shape or a spherical shape. It is also preferable that the micro probe is ground with a conductive grindstone dressed by electrolysis or ultra-precisely cut with a diamond tool. In a case where the probe of the present invention is used in on-machine measurement, when processing is performed on the same machine, highly precise processing is realized. In consequence, a highly precisely processed surface can be obtained. Especially, in a case where the probe member 2 is processed while the contact is rotated centering on the axial center, since a shape precision (an error) of the probe member 2 has a symmetric property with respect to a rotation shaft, dependence of measurement data on the contact position of the probe member 2 is reduced, and the precision of the measurement using the probe member 2 can be increased. Moreover, when the shape precision of the probe member 2 is obtained beforehand by another measurement means, it is possible to predict the precision of the measurement using the probe member 2.

Figure 9:
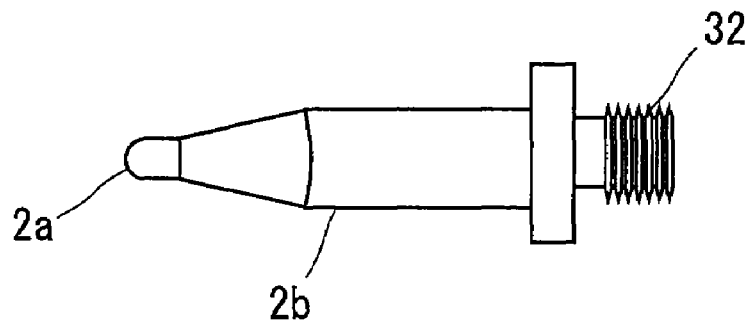
FIG. 9 is a diagram showing a probe member in which a distant end ball is formed integrally with a shaft portion.

Especially, in a case where the distant end of the probe member 2 is formed into the spherical shape, when the distant end ball is processed, molded and then attached to the probe member 2, there is a problem that there occurs not only a fluctuation of sphericity of each formed distant end ball but also an attachment error of the distant end ball. Therefore, according to the embodiment of the present invention, as shown in FIG. 9, the distant end ball 2a is processed and molded integrally with the shaft portion 2b. Therefore, since the only distant end ball is not independently processed and molded and the distant end is formed into the spherical shape integrally with the shaft portion 2b of the probe member 2, the attachment error is eliminated and the above problem can be solved. It is to be noted that in FIG. 9, reference numeral 32 is a male screw portion to be attached to the probe shaft 4. Needless to say, without using any screw, the contact may be formed into a tapered or non-axially-symmetric shape and mechanically tightened, or the contact may be tightened by a magnetic force.

It is also preferable that the probe member 2 is coated preferably with a hard thin coating (e.g., DLC, TiN, TiC or the like). In consequence, a wear resistance of the probe member 2 increases, a wear coefficient of the distant end portion of the probe member 2 can be selected and adjusted, and an effect is produced at a time when the contact is brought into contact with the object 1 to be measured.

Next, there will be described specific constitution examples of the probe member 2.

CONSTITUTION EXAMPLE 1

To control the contact pressure between the probe member 2 and the object 1 to be measured with a higher precision, the probe member 2 is elastically displaced by the contact pressure, the contact pressure is calculated from this elastic displacement and a spring constant of the probe member 2, and the control device 9 can control the pressing device based on this calculated contact pressure to adjust the pressing force. In consequence, the contact pressure can further minutely be adjusted as compared with a conventional example.

Figure 10:
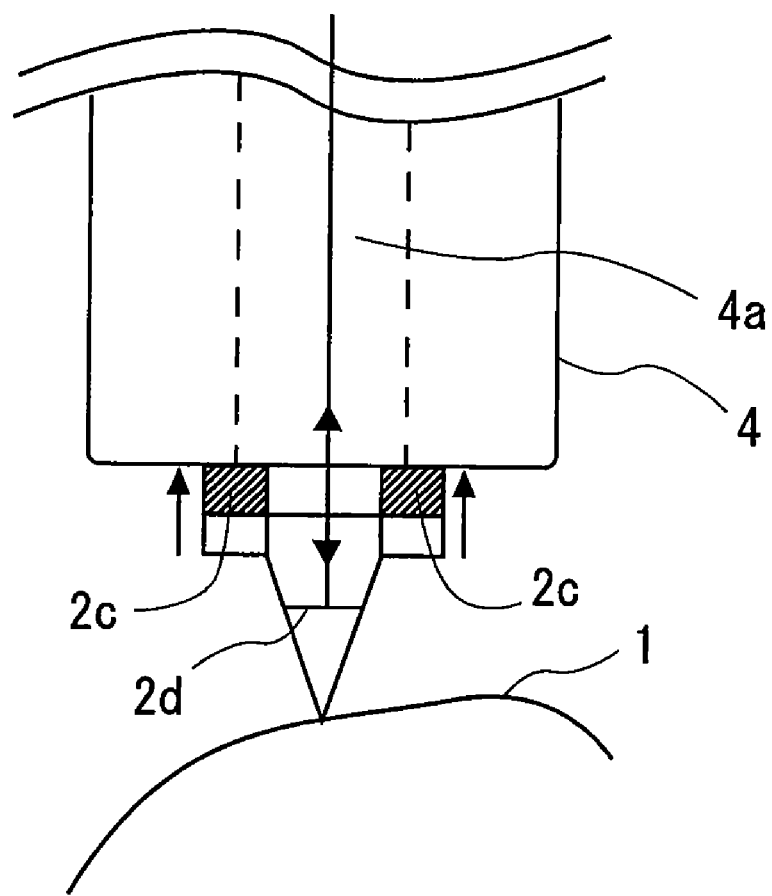
FIG. 10 is a diagram showing a constitution example of a probe member which is elastically deformed by a contact pressure.

This constitution example is shown in FIG. 10. As shown in FIG. 10, an elastic article 2c made of a rubber or a (hollow) elastic resin is sandwiched between the probe member 2 and the probe shaft 4 to connect the contact to the shaft. Furthermore, a reflective surface 2d of the probe shaft 4 directed rearwards in the axial direction is formed on the back surface of the probe member 2.

With the probe member 2 constituted in this manner, a hollow portion 4a is formed in the central part of the probe shaft 4, extending in the axial direction. Instead, the central part of the probe shaft 4 may be formed of a transparent material such as glass, extending in the axial direction. A laser displacement meter similar to the above laser displacement meter 16 emits laser light from a radiating end surface toward the reflective surface 2d through the hollow portion 4a or a transparent material portion of this probe shaft 4, and measures a position of the reflective surface 2d from the reflected light from the radiating end surface and the reflective surface 2d.

Figure 11:
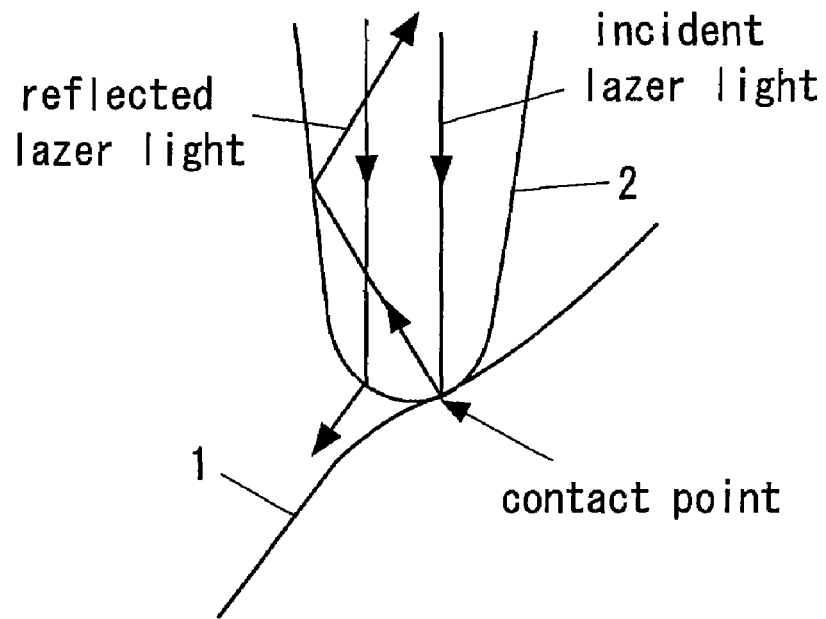
FIG. 11 is a diagram showing a constitution in which contact is sensed by use of laser light reflected by a contact point between a probe member and an object to be measured.

Moreover, a probe distant end portion (i.e., the probe member 2) may be constituted of a transparent and hard medium such as sapphire, ruby or hard glass, without using the reflective surface 2d, as shown in FIG. 11, so that the laser light may be directed as it is from the inside toward the probe distant end portion and reflected by a contact point between the probe distant end portion 2 and the object 1 to be measured. By detecting the reflected laser light, it is possible to detect the contact between the object 1 to be measured and the probe distant end portion 2. In order to reduce the impact and the contact pressure due to the contact between the probe and the object 1 to be measured before the measurement and control of the pressing force are performed by the piezoelectric element, the contact detection can be performed using the light. This is effective for avoiding surface damages on the distant end portion 2 and the object 1 to be measured. Thus, the laser displacement meter 16 can constitute a contact sensing device which irradiates the contact point between the probe member 2 and the object 1 to be measured with the laser light through the contact and which detects the laser light reflected by the contact point to sense contact between the probe member 2 and the object 1 to be measured. It is to be noted that as shown in FIG. 11, the laser light radiated to portions other than the contact point is radiated to the outside of the probe member.

Figure 12:
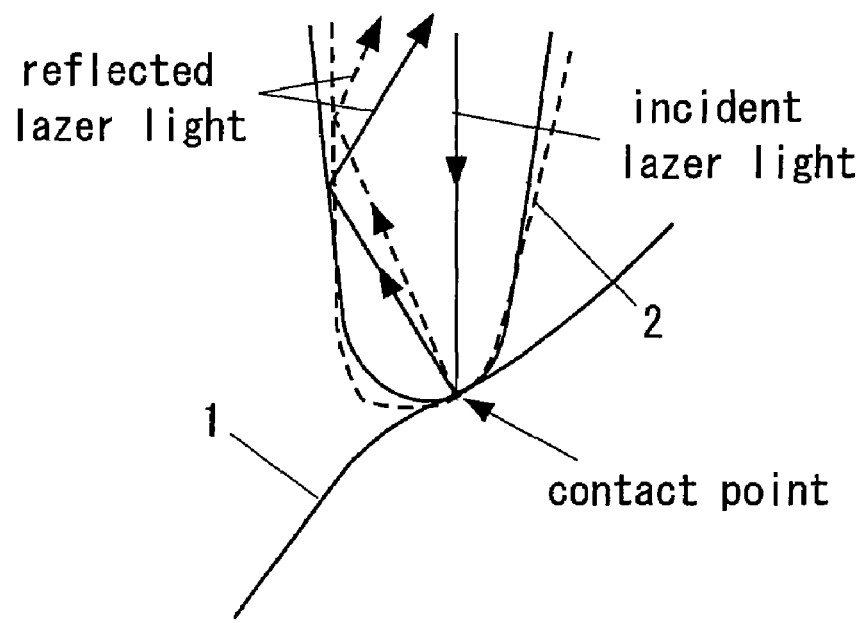
FIG. 12 is a diagram showing a constitution to sense a contact pressure between a probe member and an object based on a phase difference between laser light emitted to a contact point and laser light reflected by the contact point and returned through the probe member.

Furthermore, in this case, as shown by the broken line in FIG. 12, owing to the contact pressure applied to the probe distant end portion 2 made of the transparent medium, the probe distant end portion 2 is deformed, a stress is generated in the probe and a refractive index of the probe distant end portion 2 changes. An optical path change occurs in the form of synergy action of this deformation of the probe distant end portion 2 and the refractive index change of the probe distant end portion 2. By detecting such an optical path change by the contact sensing device (e.g., the laser displacement meter 16), the pressing force can be detected and controlled his optical path change can be detected, by measuring a phase difference between incident laser light and reflected laser light reflected by the contact point (shown by the broken line of FIG. 12) by the laser displacement meter 16. The contact pressure can be detected from the detected optical path change. It is to be noted that a relation between the phase difference and the contact pressure may be obtained beforehand using the pressing device or the micro force measurement device described in the present specification or another appropriate measurement device, and the contact pressure can be detected using the obtained relation.

Thus, if the contact or the contact pressure is sensed by the contact sensing device, any damage of the surfaces of the probe distant end portion 2 and the object 1 to be measured can be avoided, by performing such an control by the control device 9 that the pressing force of the pressing device is not increased or decreased.

The amount of the elastic displacement can be obtained from the position of the reflective surface 2d obtained in this manner, and the position of the enlarged diameter portion 17 of the probe shaft 4 obtained by the laser displacement meter 16. The contact pressure can be calculated from this amount of the elastic displacement and the spring constant of the elastic article.

In Constitution Example 1, instead of the piezoelectric ceramic 8a, the micro force measurement device is constituted of the reflective surface 2d, the laser displacement meter, and the calculating device which calculates the contact pressure from the detected value of the laser displacement meter and the spring constant of the elastic article 2c

CONSTITUTION EXAMPLE 2

Figure 13A:
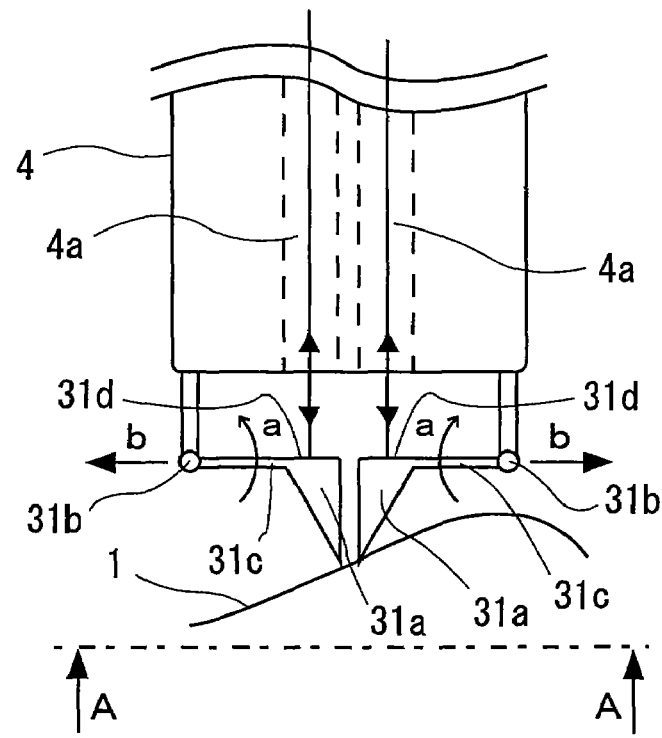
FIG. 13A is a diagram showing a constitution example of a probe member constituted of a plurality of cantilever.
Figure 13B:
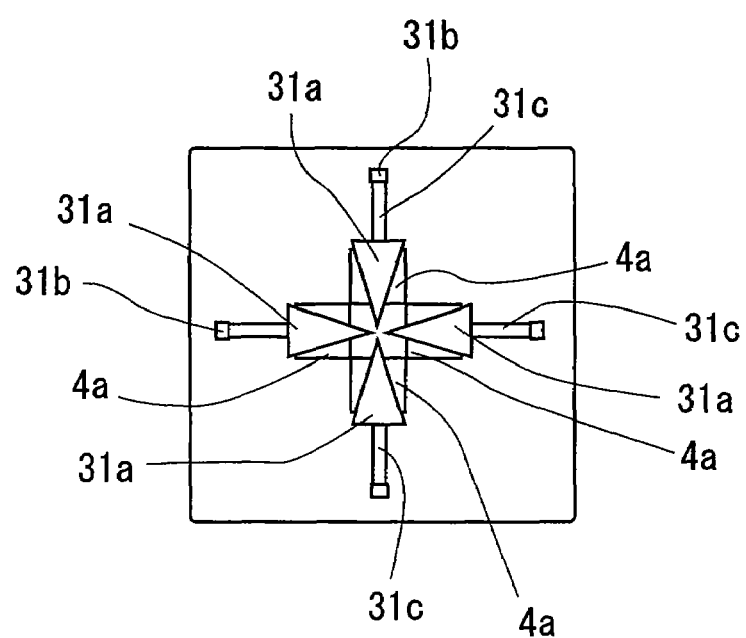
FIG. 13B is a cross sectional view, taken along the A-A arrow line of FIG. 13A.

Moreover, in a case where the surface of the object 1 to be measured is inclined with respect to the probe member 2 when the probe member 2 comes into contact with the object 1 to be measured, there is a problem that the lateral displacement occurs, as mentioned above. To solve this problem, according to the embodiment of the present invention, as shown in FIGS. 13A and 13B, the probe member 2 has a constitution in which the probe member 2 is elastically deformed s so as to prevent the lateral displacement. FIG. 13A is a side view of the probe member 2 for preventing the lateral displacement, and FIG. 13B is a cross sectional view, taken along the A-A arrow line of FIG. 13A. In the example of FIGS. 13A and 13B, the probe member 2 is constituted of four elastically deformable cantilevers which are arranged symmetrically with respect to the center of the probe member 2 and which come into contact with the object 1 to be measured in substantially the same position. A free end 31a which is one end of each cantilever is formed into a needle-like shape and positioned in the central part of the probe shaft 4 in the radial direction to come into contact with the object 1 to be measured. A fixed end 31b which is the other end of the cantilever is fixed to the probe shaft 4 in the vicinity of the outer part of the probe shaft 4 in the radial direction. The free end 31a is connected to the fixed end 31b by an elastic connecting portion 31c which is elastically deformed in a direction of the arrow a by the contact pressure. According to this constitution, even in a case where the probe member 2 comes into contact with the surface of the object to be measured which is inclined with respect to the probe member 2, four cantilevers independently are elastically deformed in accordance with the contact pressure. Reactive forces in a lateral direction shown by arrows b of FIG. 13A can be offset by the cantilevers arranged in mutually symmetric positions. In consequence, the lateral deviation of the probe shaft 4 can be prevented.

With the probe member 2 constituted in this manner, as shown in FIG. 13A, reflective surfaces 31d are formed on the back surfaces of the free ends 31a of four cantilevers. Furthermore, the center of the probe shaft 4 is provided with four hollow portions 4a corresponding to four reflective surfaces 31d, extending in the axial direction. Instead of four hollow portions 4a, four portions of the central part of the probe shaft 4 may be formed of a transparent material such as glass, extending in the axial direction. A laser displacement meter similar to the above laser displacement meter 16 emits laser light from each radiating end surface toward each reflective surface 31d through the hollow portion 4a or the transparent material portion of this probe shaft 4, and measures a position of each reflective surface 31d from the reflected light from the radiating end surface and the reflective surface 31d. It is to be noted that instead of the above four hollow portions 4a, a single hollow portion or transparent material portion may be formed into such a dimension that four laser beams do not interfere with one another.

6. Object-Measuring Swing Device

Figure 14A:
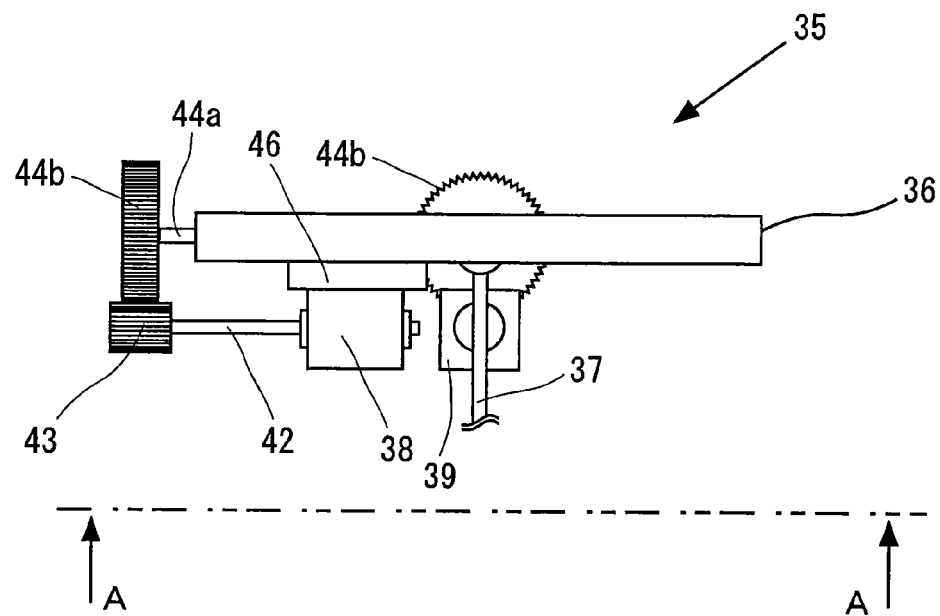
FIG. 14A is a diagram showing a constitution example of an object-measuring swing device which swings an object to be measured.
Figure 14B:
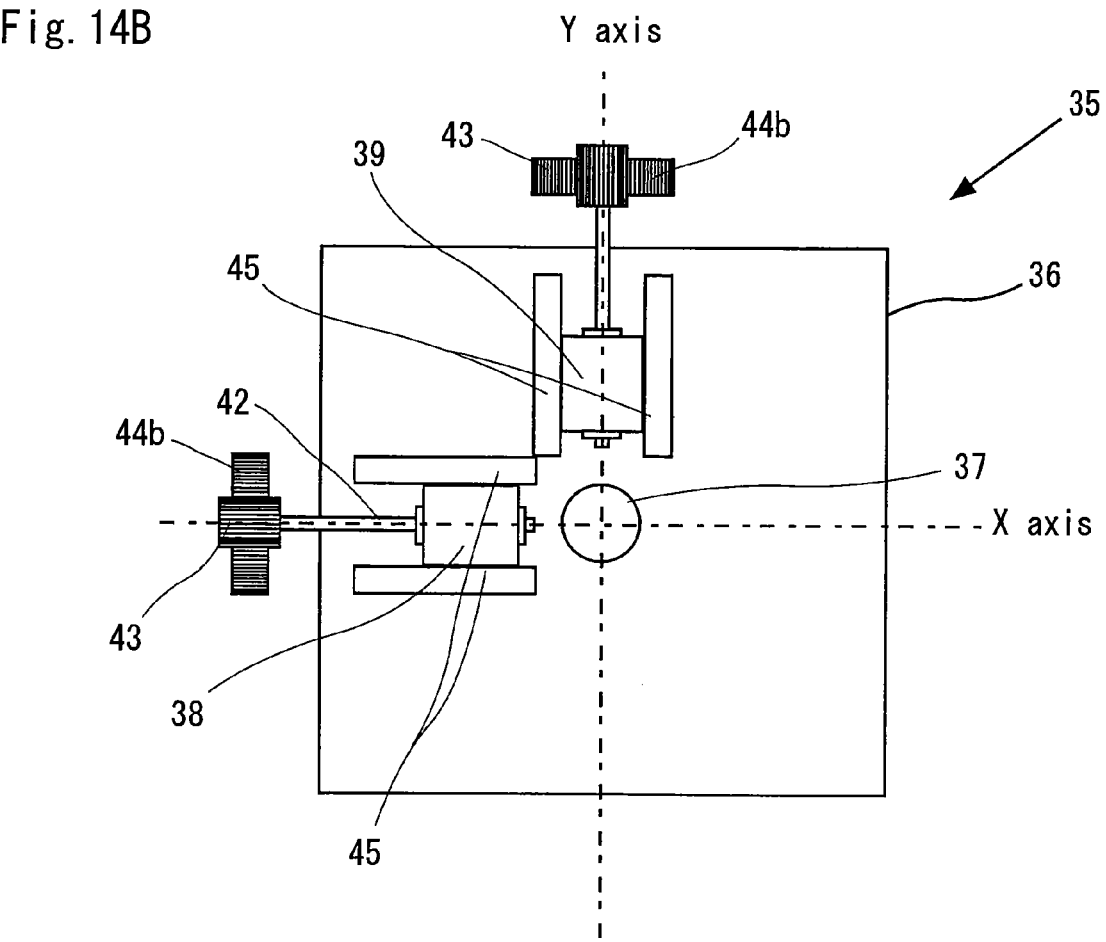
FIG. 14B is a cross sectional view, taken along the A-A arrow line of FIG. 14A.
Figure 15A:
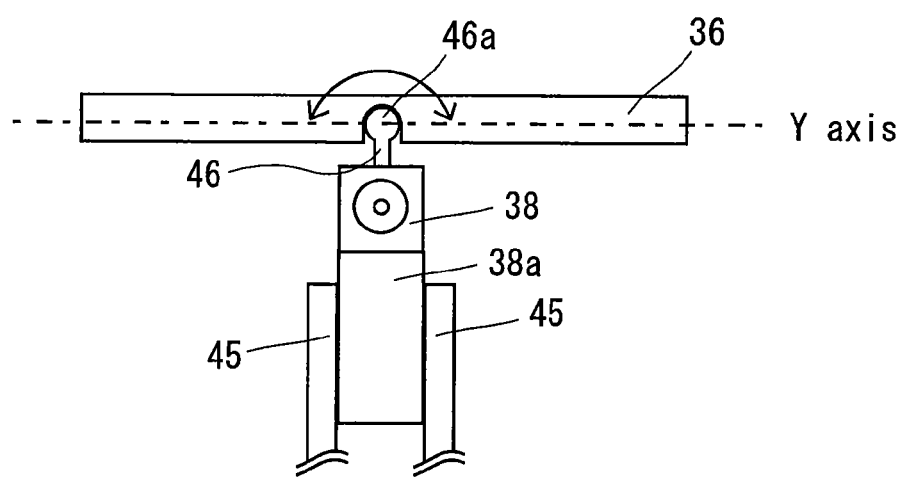
FIG. 15A is a diagram showing a constitution example of an object-measuring swing device which swings an object to be measured around an X-axis.
Figure 15B:
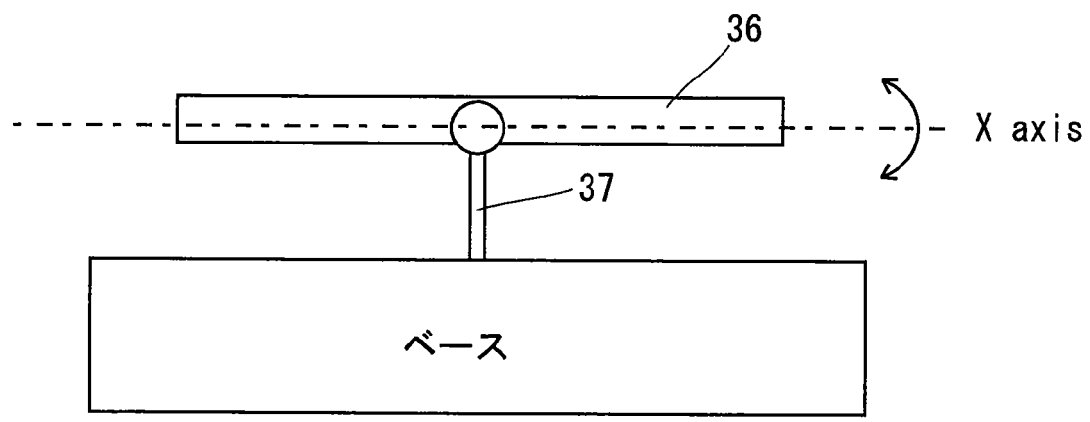
FIG. 15B is a diagram showing a constitution example of an object-measuring swing device which swings an object to be measured around a Y-axis.

It has been described above that the probe member 2 is elastically displaced to prevent the lateral deviation of the probe shaft 4, but in a case where the surface of the object to be measured is inclined with respect to the probe member 2, the object 1 to be measured may be inclined so that the probe member 2 perpendicularly contacts the surface of the object to be measured. FIGS. 14A and 14B show a constitution of a measuring object swing device 35 which is inclined with respect to the object 1 to be measured. FIG. 14A is a side view of an object-measuring swing device 35, FIG. 14B is a cross sectional view, taken along the A-A arrow line of FIG. 14A, and FIGS. 15A and 15B are diagrams showing a swing operation. It is to be noted that in the drawings, members are appropriately omitted for the sake of simplicity. This object-measuring swing device 35 has a swing table 36 to which the object 1 to be measured is fixed; a table support member 37 which rotatably receives the swing table 36 by a spherical surface; and rotation motors 38 and 39 which are arranged on the back surface of the swing table 36 and which rotate the swing table 36 around an X-axis and a Y-axis, respectively. The rotation motors 38 and 39 may be, for example, stepping motors or servo motors.

As shown in FIGS. 14A and 15A, an engagement member 46 which engages with the back surface of the swing table 36 is provided above the rotation motor 38. As shown in FIG. 15A, the lower end portion of this engagement member 46 is fixed to the upper surface of the rotation motor 38, and the upper end portion 46a engages with the back surface of the swing table 36. The upper end portion 46a of the engagement member 46 is formed into a columnar shape which is concentric with the X-axis. The upper end portion 46a engages with a columnar groove formed in the back surface of the swing table 36, and is thus connected to the swing table 36. When the columnar upper end portion 46a of this engagement member 46 engages with the cylindrical groove, the swing table 36 can rotate with respect to the rotation motor 38 around the X-axis.

As shown in FIGS. 14A and 14B, a gear 43 is integrally attached to an output shaft 42 of the rotation motor 38, and this gear 43 engages with a gear 44b integrally attached to a swing shaft 44a which is coaxial with the X-axis of the swing table 36. When the rotation motor 38 rotates, the swing shaft 44a integral with the swing table 36 is rotated via the gears 43 and 44b. In consequence, the swing table 36 is swung around the X-axis. At this time, as shown in FIG. 15A, the rotation motor 38 is fixed in a Y-axis direction by guide members 45 fixed to frames or the like separated from the swing device 35. That is, a member 38a to be guided which is fixed to the rotation motor is fixed in the Y-axis direction by the guide members 45. Therefore, the rotation motor 38 can rotate the swing table 36 around the X-axis. However, when the other rotation motor 39 rotates, the guide members 45 and the member 38a to be guided are movable in a direction perpendicular to the Y-axis in the rotation motor 38. Therefore, the guide members 45 does not hinder the rotation of the other rotation motor 39. It is to be noted that in a case where a pulse for stopping the rotation motor 38 is input into the rotation motor 38, since the output shaft 42 of the rotation motor 38 is stopped, the swing table 36 is maintained in a stop state at a predetermined inclined angle.

The other rotation motor 39 has the same constitution, and the swing table 36 is swung around the Y-axis.

As described above, the swing table 36 is rotated around the X-axis and the Y-axis by the rotation motors 38, 39, but the center of the swing table 36 is supported at a certain height by the support member 37 so that the table is rotatable around the X-axis and the Y-axis. Therefore, the center is immobile (see FIG. 15B).

This swing device 35 can rotate the object 1 to be measured which is disposed on the swing table 36 around the X-axis and the Y-axis to incline the object 1 to be measured so that the probe member 2 vertically comes into contact with the surface of the object 1 to be measured.

It is to be noted that even when the swing table 36 is rotated, the center of the swing table 36 is immobile, but the position of the surface of the object 1 to be measured which is fixed onto the swing table 36 slightly deviates owing to a thickness of the object 1 to be measured. When this positional deviation occurs, position adjustment of the probe member 2 and/or the swing device 35 can be performed based on a height of a measurement object point of the object 1 to be measured and a rotation angle of the object around the X-axis and the Y-axis. In a case where another error is generated, the error is estimated beforehand, and adjustment is performed based on this estimated error.

As described above, the object-measuring swing device 35 swings the object 1 to be measured so that the surface of the object to be measured is perpendicular to the probe member 2, and a shape is then measured by the probe member 2. Based on this measurement data and swing data (the rotation angle around the X-axis or the Y-axis), inverse calculation can be performed to obtain the surface shape of the object 1 to be measured. It is to be noted that the rotation motors 38, 39 constitute swing means for swinging the object to be measured, but other appropriate members may constitute the swing means.

Moreover, to measure an object to be measured having a steep inclination change, it is preferable that the measurement is performed under a certain angle control from a certain portion (range) to a certain portion (range), the measured is performed under another angle control from another portion (range) to another portion (range), and data is stitched (pasted) by a calculating function using a computer. In this manner, it is possible to highly precisely and effectively perform measurement of the object to be measured having a large area and having a steep surface shape.

The data obtained by measurement and calculation processing can be stored as a matrix which is an error ($\delta X$, $\delta Y$, $\delta Z$) between an actual shape and a designed shape, if design data of the object 1 to be measured is given beforehand together with a set (a matrix) which means an absolute coordinate value of (X, Y, Z). The data can be stored as data having a CAD software readable form. In a case where these functions are used, when a program is converted into a numerical control (NC) program of a tool required for additional processing of the object 1 to be measured again by use of the resultant data, the precision can further be improved by the additional processing of the object 1 to be measured. It is to be noted that on the same measuring object swing device 35, the measurement and the processing of the object 1 to be measured may be performed.

7. Pressing Device Using Magnetic Force

Moreover, the pressing device using the pressurized gas has been described above, but the present invention is not limited to this device, and another device may be used.

Figure 16A:
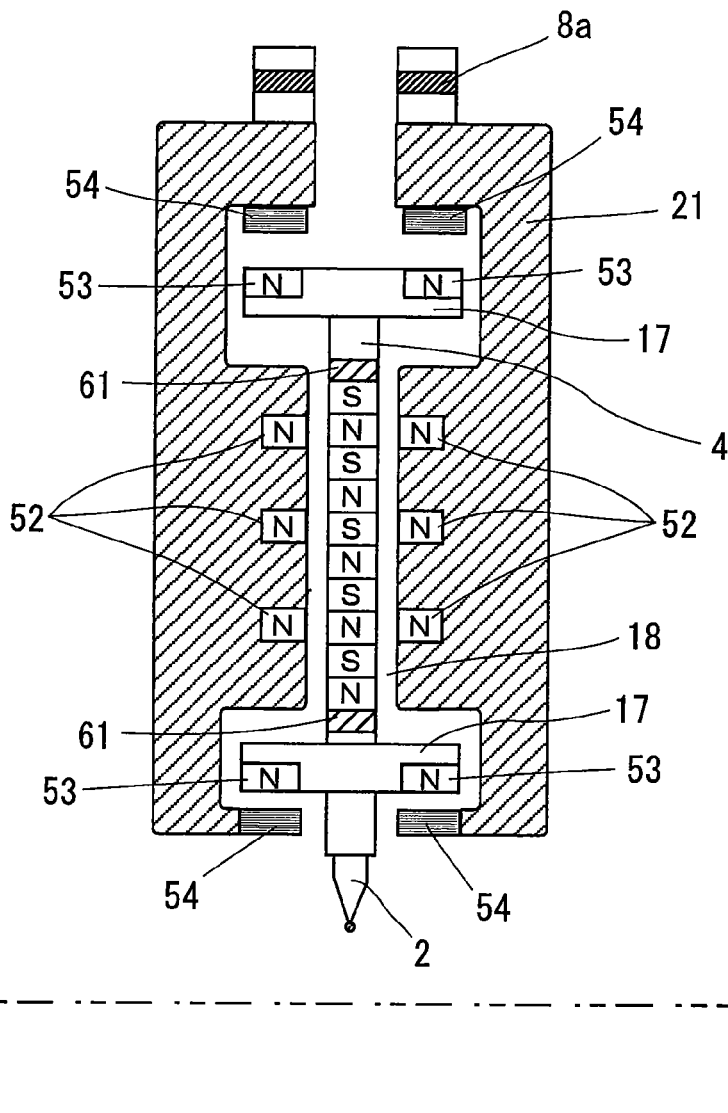
FIG. 16A is a diagram showing a constitution example of a pressing device using a magnetic force.
Figure 16B:
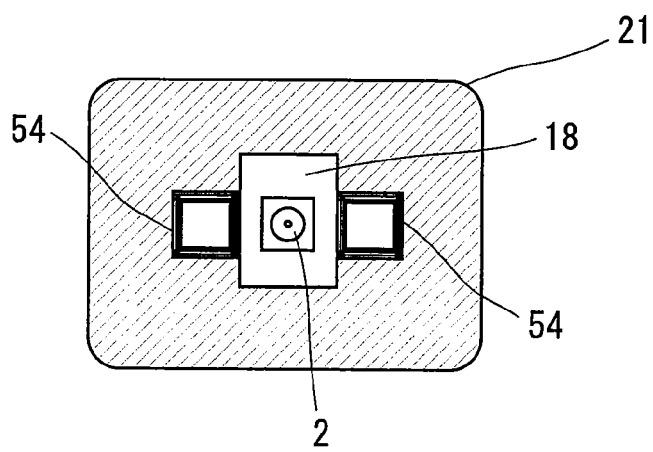
FIG. 16B is a cross sectional view, taken along the A-A arrow line of FIG. 16A.

For example, as shown in FIGS. 16A and 16B, the pressing device may use a magnetic force. FIG. 16A is a side cross sectional view of the probe body 21 in which the pressing device using the magnetic force is incorporated, and FIG. 16B is a cross sectional view, taken along the A-A arrow line of FIG. 16A. As shown in FIGS. 16A and 16B, in order to support the probe shaft 4 in a non-contact manner from the probe body 21, a plurality of permanent magnets are arranged between nonmagnetic plates 61 in the probe shaft 4, and a plurality of N-poles 52 are arranged at appropriate intervals on the surface of the hollow portion 18 of the probe body 21 as shown in FIG. 16A. In consequence, the probe shaft 4 can be kept in the non-contact state from the probe body 21 by the magnetic force which works between the plurality of permanent magnets and the N-poles 52 on the surface of the hollow portion 18 in the probe shaft 4.

Furthermore, in order to urge and move the probe shaft 4 in the vertical direction, the permanent magnets are arranged so that N-poles 53 are exposed externally from the enlarged diameter portions 17 on the rear end and the distant end of the probe shaft 4 in a vertical axis direction, respectively, and pressing coils 54 are arranged in positions facing these N-poles 53 in the probe body 21. According to this constitution, a current flowing through the pressing coil 54 on the distant end and a current flowing through the pressing coil 54 on the rear end are separately controlled to allow the magnetic force to act between the N-pole 53 and the pressing coil 54 which face each other in the vertical direction. In consequence, the probe shaft 4 is supported and moved in the vertical direction. The influence of the weight of the probe shaft 4 is offset by current adjustment of the pressing coil 54. Another constitution is similar to that of the above embodiments. In the example of FIGS. 16A and 16B, the N-poles 53 and the pressing coils 54 constitute the pressing device.

In addition, here, even if shown N-poles and S-poles are arranged in reverse, needless to say, a similar operating function can be obtained.

Moreover, when a static electric force is used instead of the magnetic force, that is, when portions corresponding to the above two magnetic poles are charged into + and −, the similar operating function can be obtained. Moreover, the magnetic force may partly be used, the static electric force may partly be used, and the forces may be combined.

It is to be noted that the present invention is not limited to the above embodiments. Needless to say, the present invention can variously be changed without departing from the scope of the present invention. For example, it has been described above that a displacement amount measuring device is constituted of a laser interferometer, but the displacement amount measuring device may be constituted using an electrostatic capacity and an eddy current.

The invention claimed is:

1. A micro force measurement device comprising:
    a probe member for contacting an object;
    a support structure for supporting the probe member in a non-contact manner;
    a pressing device fixed to the support structure for pressing the probe member onto the object;
    a piezoelectric sensor incorporated in the support structure so that a reactive force to the pressing contact acts when the pressing device presses the probe member to bring the probe member into contact with the object;
    voltage supply means for applying an alternating voltage between opposite polar plates of the piezoelectric sensor; and
    impedance detection means for detecting an impedance between the polar plates of the piezoelectric sensor by converting the impedance into a voltage.

2. The micro force measurement device according to claim 1, wherein a value of a frequency of the alternating voltage applied between the opposite polar plates of the piezoelectric sensor is in the vicinity of a resonance frequency of the piezoelectric sensor.

3. A micro force measurement device comprising:
    an object to be pressed;
    a support structure for supporting the object to be pressed in a non-contact manner;
    a pressing device fixed to the support structure for applying a pressing force onto the object to be pressed;
    a piezoelectric sensor incorporated in the support structure so that a reactive force acts when the pressing device applies the pressing force to the object to be pressed;
    voltage supply means for applying an alternating voltage between opposite polar plates of the piezoelectric sensor; and
    impedance detection means for detecting an impedance between the polar plates of the piezoelectric sensor by converting the impedance into a voltage to detect the impedance.

4. The micro force measurement device according to claim 3, wherein a value of a frequency of the alternating voltage applied between the opposite polar plates of the piezoelectric sensor is in the vicinity of a resonance frequency of the piezoelectric sensor.

5. A micro surface shape measurement probe comprising:
    a probe shaft having at a distant end thereof a probe member for contacting an object to be measured;
    a probe body provided with support means for movably supporting the probe shaft in a non-contact manner;
    a pressing device for pressing and moving the probe shaft toward the object to be measured;
    a piezoelectric sensor incorporated in the probe body so that a reactive force to a pressing force applied to the probe shaft by the pressing device acts;
    a load detecting device for measuring a load acting on the piezoelectric sensor;
    a control device for adjusting the pressing force applied by the pressing device based on the load detected by the load detecting device; and
    a displacement amount measuring device for measuring a position of the probe member in contact with the object to be measured under the pressing force adjusted by the control device.

6. The micro surface shape measurement probe according to claim 5, further comprising:
    voltage supply means for applying an alternating voltage between opposite polar plates of the piezoelectric sensor; and
    impedance detection means for detecting an impedance between the polar plates of the piezoelectric sensor by converting the impedance into a voltage.

7. The micro surface shape measurement probe according to claim 5, wherein a value of a frequency of the alternating voltage applied between opposite polar plates of the piezoelectric sensor is in the vicinity of a resonance frequency of the piezoelectric sensor.

8. The micro surface shape measurement probe according to claim 5, wherein the probe member has a spherical or needle-like distant end and a shaft portion, and wherein the distant end is formed integrally with the shaft portion.

9. The micro surface shape measurement probe according to claim 5, wherein the probe member has a spherical shape, a conical shape, a pyramid shape or a combined shape of these shapes, and is coated with a hard coating.

10. A micro surface shape measurement probe according to claim 5, further comprising a contact sensing device for sensing contact between the probe member and the object by irradiating a contact point between the probe member and the object with laser light, through the probe member, and detecting the laser light reflected by the contact point.

11. The micro surface shape measurement probe according to claim 5, further comprising a contact sensing device for sensing contact pressure between the probe member and the object based on a phase difference between laser light emitted to a contact point between the probe member and the object through the contact, and laser light reflected by the contact point and returned through the probe member.

12. The micro surface shape measurement probe comprising:
  a probe shaft having at a distant end thereof a probe member for contacting an object to be measured;
  a probe body provided with support means for movably supporting the probe shaft in a non-contact manner;
  a pressing device for pressing and moving the probe shaft toward the object to be measured; and
  a displacement amount measuring device for measuring a position of the probe member in contact with the object to be measured; wherein
  the probe member is constituted of a plurality of cantilevers arranged symmetrically with respect to the center of the probe member; and
  each cantilever has a free end that is positioned in a central part of the probe shaft in a radial direction thereof and comes into contact with the object to be measured, and a fixed end fixed to the probe shaft in the vicinity of an outer part thereof in the radial direction, and an elastic connecting portion that connects the free end to the fixed end and is elastically deformed by a contact pressure between the free end and the object to be measured.

13. A micro surface shape measurement probe according to claim 12, where a reflective surface is formed on the back surface of the free end of each cantilever; and
  the displacement amount measuring device has a laser displacement meter which radiates laser light from a radiating end surface toward the reflective surface of each cantilever to measure a displacement of the free end of each cantilever based on reflected lights from the radiating end surface and the reflective surface.

14. The micro surface shape measurement probe comprising a probe member having a plurality of cantilevers arranged symmetrically with respect to a center of the probe member for contacting an object; wherein
  each cantilever has a free end that is positioned in an central part in a radial direction for contacting the object, and a fixed end fixed in the vicinity of an outer part in the radial direction, and an elastic connecting portion that connects the free end to the fixed end and is elastically deformed by a contact pressure between the free end and the object.

* * * * *